US011220461B2

(12) United States Patent
Morlat et al.

(10) Patent No.: US 11,220,461 B2
(45) Date of Patent: Jan. 11, 2022

(54) METHOD FOR THE PRODUCTION OF GYPSUM-BASED BOARDS AND STUCCO SLURRY COMPRISING NON-PREGELATINIZED MIGRATORY STARCH FOR USE THEREWITH

(71) Applicant: Saint-Gobain Placo SAS, Suresnes (FR)

(72) Inventors: Richard Morlat, Vaujours (FR); James Fletcher, Loughborough (GB); Radomir Kamler, Prague (CZ)

(73) Assignee: Saint-Gobain Placo SAS, Suresnes (FR)

( * ) Notice: Subject to any disclaimer, the term of this patent is extended or adjusted under 35 U.S.C. 154(b) by 68 days.

(21) Appl. No.: 16/869,555

(22) Filed: May 7, 2020

(65) Prior Publication Data

US 2020/0262756 A1 Aug. 20, 2020

Related U.S. Application Data

(62) Division of application No. 16/060,783, filed as application No. PCT/GB2016/053930 on Dec. 14, 2016, now Pat. No. 10,683,235.

(30) Foreign Application Priority Data

Dec. 22, 2015 (GB) .................................... 1522664

(51) Int. Cl.
| | | |
|---|---|---|
| *B32B 27/02* | (2006.01) | |
| *C04B 28/14* | (2006.01) | |
| *C04B 11/00* | (2006.01) | |
| *B28B 5/02* | (2006.01) | |
| *B28B 11/12* | (2006.01) | |
| *B28B 17/02* | (2006.01) | |
| *C04B 14/42* | (2006.01) | |
| *C04B 24/38* | (2006.01) | |
| *C04B 111/00* | (2006.01) | |

(52) U.S. Cl.
CPC ............ *C04B 28/144* (2013.01); *B28B 5/027* (2013.01); *B28B 11/12* (2013.01); *B28B 17/023* (2013.01); *C04B 11/007* (2013.01); *C04B 14/42* (2013.01); *C04B 24/383* (2013.01); *C04B 28/141* (2013.01); *C04B 28/145* (2013.01); *C04B 2111/0062* (2013.01)

(58) Field of Classification Search
CPC ..... C04B 14/42; C04B 24/383; C04B 28/144; C04B 28/145; C04B 2103/32; C04B 24/003; C04B 24/04; C04B 24/226; C04B 11/007; C04B 2111/0062; C04B 28/141; B28B 11/12; B28B 17/023; B28B 5/027
See application file for complete search history.

(56) References Cited

U.S. PATENT DOCUMENTS

| | | |
|---|---|---|
| 2003/0084980 A1 | 5/2003 | Seufert et al. |
| 2005/0126437 A1 | 6/2005 | Tagge et al. |
| 2005/0223949 A1 | 10/2005 | Bailey, Jr. et al. |
| 2007/0048490 A1 | 3/2007 | Yu |
| 2007/0059513 A1 | 3/2007 | Yu et al. |
| 2007/0284027 A1 | 12/2007 | Sahay |
| 2013/0092055 A1 | 4/2013 | Hilken |
| 2014/0113124 A1 | 4/2014 | Sang |
| 2014/0315008 A1 | 10/2014 | Francis |
| 2015/0104629 A1 | 4/2015 | Cao |
| 2015/0175482 A1 | 6/2015 | Stav |
| 2017/0306622 A1 | 10/2017 | Rideout |
| 2017/0335565 A1 | 11/2017 | Brooks |

FOREIGN PATENT DOCUMENTS

| | | |
|---|---|---|
| CN | 101649669 | 2/2010 |
| EP | 2 263 987 | 12/2010 |
| EP | 2 263 987 A1 | 12/2010 |
| WO | 2004/002916 | 1/2004 |
| WO | WO 2004/002916 A1 | 1/2004 |

(Continued)

OTHER PUBLICATIONS

International Preliminary Report on Patentability issued in co-pending International Patent Application No. PCT/GB2016/053930, International Bureau of WIPO, dated Jul. 5, 2018, 11 pages.

(Continued)

*Primary Examiner* — Lawrence D Ferguson
(74) *Attorney, Agent, or Firm* — McDonnell, Boehnen, Hulbert & Berghoff LLP

(57) ABSTRACT

A method for continuously forming gypsum-based panels of high fixing strength comprises the steps of: •forming a mixture comprising stucco, non-pregelatinized migratory starch, glass fibre, fluidizer and water; •casting the mixture in a continuous band; •maintaining the band under conditions sufficient for the stucco to form an interlocking matrix of set gypsum; •cutting the band to form one or more wet panel precursors; and •drying the wet panel precursor to form one or more gypsum-based panels. •The weight ratio of water to stucco in the mixture is less than 0.7; •the stucco is present in the mixture in an amount of over 60 wt % relative to the total solids content of the mixture; •the starch is present in the mixture in an amount of over 3 wt % relative to the stucco; •the glass fibre is present in the mixture in an amount of over 1 wt % relative to the stucco; •the fluidizer is present in the mixture in an amount of at least 0.1 wt % relative to the stucco; and the density of the gypsum-based panel is greater than 700 kg/m.

20 Claims, No Drawings

(56) References Cited

FOREIGN PATENT DOCUMENTS

| WO | 2011/020528 | 2/2011 |
| WO | WO 2011/020528 A1 | 2/2011 |
| WO | 2013/087705 | 6/2013 |
| WO | WO 2013/087705 A2 | 6/2013 |
| WO | 2014/138283 | 9/2014 |
| WO | 2014/188168 | 11/2014 |
| WO | WO 2014/188168 A2 | 11/2014 |
| WO | 2016/079531 | 5/2016 |

OTHER PUBLICATIONS

International Search Report and Written Opinion dated Mar. 31, 2017 for International Application No. PCT/GB2016/053930 filed Dec. 14, 2016, 17 Pages.
Great Britain search report for Great Britain Application No. 1522664.0 filed Dec. 22, 2015, 1 page.

METHOD FOR THE PRODUCTION OF GYPSUM-BASED BOARDS AND STUCCO SLURRY COMPRISING NON-PREGELATINIZED MIGRATORY STARCH FOR USE THEREWITH

This application is a divisional of U.S. patent application Ser. No. 16/060,783, filed Jun. 8, 2018, which is hereby incorporated herein by reference in its entirety. U.S. patent application Ser. No. 16/060,783 is a U.S. national phase application of International Patent Application no. PCT/GB2016/053930, filed Dec. 14, 2016. International Patent Application no. PCT/GB2016/053930 claims the benefit of priority of Great Britain Patent Application no. 1522664.0, filed Dec. 22, 2015.

FIELD OF THE INVENTION

The present invention relates to a method for the production of gypsum-based boards and a stucco slurry for use therewith. In particular, the invention relates to a method for the production of gypsum-based boards using a stucco slurry having a low water gauge.

BACKGROUND TO THE INVENTION

A gypsum plasterboard or wallboard typically comprises a core layer of gypsum (calcium sulphate dihydrate) sandwiched between two outer layers of a liner, such as a paper liner.

Such boards are generally produced in a continuous process using calcined gypsum as a starting material. Calcined gypsum (also known as stucco) is calcium sulphate dihydrate that has been heated to drive off at least some of the bound water molecules, and therefore comprises mainly calcium sulphate hemihydrate and in certain cases also some calcium sulphate anhydrite.

The stucco is fed into a mixer with water and additives to produce a stucco slurry that is deposited onto a continuously advancing paper liner moving on a conveyor. The slurry is allowed to spread over the advancing paper liner before a second liner is laid over the slurry to provide a continuous band of wallboard preform having a sandwich structure. The preform may be subjected to a shaping process to meet the desired thickness. As the band of stucco slurry is moved forward by the conveyor belt, the stucco reacts with the water in the slurry to form calcium sulphate dihydrate, and begins to set. When the stucco reaches a point in the production line that the setting process is sufficiently advanced, segments of the stucco band are cut off and sent for drying.

A parameter of critical importance in the production of gypsum wallboard is the water gauge of the stucco slurry (that is, the water-to-stucco ratio by mass). The water content of the slurry is considerably in excess of that required for the stucco to form calcium sulphate dihydrate. The additional water is required to provide the stucco slurry with sufficient fluidity to allow the slurry to spread evenly when it is deposited on the wallboard liner.

The plasterboard panels produced in this way are commonly used to provide partitions within buildings. Their advantages for this application include the fact that they are light and quick to install. However, in certain cases, plasterboard panels may have the drawback that they are not strong enough to support fixtures (e.g. sinks, televisions, radiators, fire extinguishers, shelves and any other item that requires attachment to the panel). In such cases, the weight of the fixture may cause the fixing means (e.g. screws) to be pulled out of the panel, such that the fixture falls away from the partition.

Typically, this problem has been addressed by providing plywood sheets to increase the fixing strength of the panel. In this case, the plywood sheet is fixed to the supporting frame of the panel, and the plasterboard subsequently affixed to the plywood sheet, such that the plywood sheet is provided on the side of the panel opposite to that on which the fixture is to be located. The plywood sheet may provide increased strength for retaining one or more fixing means (e.g. screws) employed to secure the fixture to the panel. Typically, the plywood sheet is positioned within the partition framework, and the plasterboard then fixed to the plywood, so that it lies outside the partition framework.

As an alternative, metal support means may be provided. These may comprise fixing plates, channels, straps, or metal fasteners. As is the case for plywood sheets, the metal support means are generally positioned on the side of the panel opposite that to which the fixture is to be secured, and act to receive and secure fixing means, e.g. fixing screws, that are used to attach the fixture to the panel.

Both these arrangements have the disadvantage that they require additional installation actions to be carried out on-site to secure the panels and the additional supporting components. Moreover, when metal support means are used, a plurality of such support means may be needed to support the full set of fixing means required to secure the fixture to the panel. Thus, the installation process may be time-consuming and expensive.

Furthermore, the addition of metal support means or plywood sheets increases the weight and thickness of the partition, and/or results in a reduction in cavity wall space. In general, the plywood itself must be cut to size on site, thus increasing the time required for installation and possibly leading to the release of dust and potentially harmful components.

It has been found that by including relatively high levels of polymer additives (such as starch), as well as fibres (e.g. glass fibres) in the plasterboard, significant improvements in fixing strength may be achieved.

However, it is thought that the presence of polymer (particularly starch) and fibre additives in the stucco slurry leads to reduced slurry fluidity, unless the water gauge of the slurry is increased.

SUMMARY OF THE INVENTION

Surprisingly, it has been found that stucco slurries containing starch and fibre additives may be used for the continuous production of gypsum-based board, even at significantly lower water gauges than previously thought.

This has numerous advantages, particularly in relation to the drying of the gypsum-based board. A lower water gauge assists drying because it allows a reduction in drying time and/or temperature. This is especially beneficial in relation to gypsum-based boards containing high levels of starch, because starch tends to have a strong affinity for water, thus normally tending to increase the time and/or energy required for drying, which may in turn lead to problems such as burning of the board and/or lower mechanical performance of the board.

The starches used in plasterboard manufacture may be migratory or non-migratory. These terms refer to the ability of the starch to disperse through the board during drying of the board. Migratory starch has the advantage that it is able to travel through the gypsum core to the interface with the liner of the board, where it may act as a glue to bond the liner to the core and/or protect the board from burning. However, the tendency of migratory starch to disperse out of the gypsum core means that less starch is available within the core to increase the strength of the core.

Surprisingly, it has been found that the use of a low water gauge is particularly beneficial in the case that the starch is a migratory starch, because it is thought to allow greater control of the movement of the starch through the gypsum core. That is, by lowering the water gauge, the tendency of the starch to disperse outwards from the gypsum core may be limited, such that an improved balance may be achieved between the need to supply starch to the core/liner interface and the need to retain starch within the gypsum core to improve strength. By controlling the amount of starch that reaches the interface between the gypsum core and liner, the tendency of the starch to obstruct the pore network at the board surface and hinder the drying process may also be reduced.

Therefore, in a first aspect, the present invention may provide a method for continuously forming gypsum-based panels, comprising:
- forming a mixture comprising stucco, migratory starch, glass fibre and water; casting the mixture in a continuous band;
- maintaining the band under conditions sufficient for the stucco to form an interlocking matrix of set gypsum;
- cutting the band to form one or more wet panel precursors; and drying the wet panel precursor to form one or more gypsum-based panels;
- wherein the weight ratio of water to stucco in the mixture is less than 0.7;
- the stucco is present in the mixture in an amount of over 60 wt % relative to the total solids content of the mixture;
- the starch is present in the mixture in an amount of over 3 wt % relative to the stucco;
- the glass fibre is present in the mixture in an amount of over 1 wt % relative to the stucco; and
- the density of the gypsum-based panel is greater than 700 kg/m$^3$.

A migratory starch is a non-cooked starch that has been modified through e.g. acid-thinning, thermal decomposition, or oxidation, to cleave the starch molecule through hydrolysis, such that the molecular chain length of the starch is reduced. The term "migratory starches" excludes, for example, pregelatinised starches that are specifically modified to reduce migratory characteristics.

Typically, the ratio of water to stucco in the slurry is less than 0.65, preferably less than 0.60, more preferably less than 0.55. In general, the ratio of water to stucco in the slurry is greater than 0.4.

In general, the stucco is present in the mixture in an amount of over 70 wt % relative to the total solids content of the mixture, in certain cases over 80 wt %.

Typically, the starch is present in the mixture in an amount of over 4 wt % relative to the stucco, in certain cases over 5 wt %.

In certain cases, the density of the gypsum-based panel is greater than 800 kg/m$^3$.

Typically, the low water to stucco ratio is achieved through the addition of a fluidiser to the slurry, such as a polycarboxylate-based fluidiser, a phosphate polycondensate (preferably a phosphate polycondensate comprising side chains) and/or a naphthalenesulphonate-based fluidiser. The fluidiser is typically present in an amount of at least 0.10 wt % relative to the stucco, preferably at least 0.20 wt %, more preferably at least 0.50 wt %

A further means for obtaining low water gauge may be to subject the stucco to a conditioning treatment after calcination and before the formation of the stucco slurry. The conditioning treatment comprises the step of annealing the calcined gypsum so as to reduce the number of microcracks. The conditioning treatment may comprise the step of exposing the stucco to water vapour at raised temperatures and/or pressures (for example, the stucco may be exposed to a relative humidity of at least 70% at a temperature of above 100° C.). As an alternative, the conditioning treatment may comprise grinding the stucco in the presence of small quantities of water or aqueous solutions.

Thus, in certain cases, the method further comprises the inclusion of a fluidiser within the mixture and/or the use of a stucco that has been subjected to a conditioning treatment.

In certain cases, the glass fibres are present in an amount of at least 1.5 wt % relative to the stucco, preferably at least 2 wt %.

Typically, the glass fibres have an average length in the range 3-12 mm.

In general, the glass fibres have an average diameter in the range 5-50 micron.

In a second aspect, the present invention may provide stucco slurry for use in a continuous method for preparing a gypsum-based panel having a density of at least 700 kg/m$^3$, the slurry comprising:
- stucco, non-pregelatinised migratory starch, glass fibre and water;
- wherein the weight ratio of water to stucco in the mixture is less than 0.7;
- the stucco is present in the slurry in an amount of over 60 wt % relative to the total solids content of the slurry;
- the starch is present in the slurry in an amount of over 3 wt % relative to the the stucco;
- the glass fibre is present in the slurry in an amount of over 1 wt % relative to the stucco.

In certain cases, the glass fibres are present in an amount of at least 1.5 wt % relative to the stucco, preferably at least 2 wt %.

The slurry of the second aspect of the invention may have one or more optional features of the slurry formed in the method of the first aspect of the invention, whether taken alone or in combination.

The water gauge of the slurry used to produce a gypsum panel may be determined by examining the pores present in the panel. Typically, pores may be characterised as air voids (that is, they arise from the incorporation of air into the slurry, e.g. through the addition of foam to the slurry) or water voids (that is, they arise from the evaporation of the excess water present in the slurry. Excess water refers to the fraction of water in the slurry that is in excess of that required to rehydrate the stucco particles).

Typically, air voids have a rounded shape (for example, they may have an elliptical cross-section) and are also generally separated from other air voids and thus generally discontinuous. In general, air voids have a diameter greater than 10 micron and often greater than 15 micron.

Typically, water voids are irregular in shape and are also linked to other water voids, forming irregular channels in a generally continuous network between set gypsum crystals. In general, the maximum dimension of water voids is less than 7 micron, more often less than 5 micron.

Therefore, in a third aspect, the present invention may provide a panel having a maximum dimension greater than 1 m, the panel having a gypsum-based core that comprises a gypsum matrix having embedded therein a starch in an amount of at least 3 wt % relative to the gypsum and glass fibre in an amount of at least 1 wt % relative to the gypsum, wherein the density of the gypsum-based core is greater than 700 kg/m$^3$, and the amount of gypsum in the gypsum-based core is greater than 60 wt %, and further wherein the total volume of water voids is less than the total volume of the gypsum in the panel core.

Typically, the total volume of water voids is less than 90% of the total volume of gypsum in the panel core, preferably less than 80%, more preferably less than 70%.

Preferably the starch is a migratory starch.

The total volume of water voids may be determined from scanning electron micrographs of panel sections. The total volume of gypsum in the panel core (that is, the true volume of the gypsum, excluding pores) may be determined through energy-dispersive x-ray analysis (EDAX) of sections of the panel core.

the surface of the sample. The load transfer element has a first portion that is configured to lie between the screw head and the surface of the sample, and a second portion that is configured to engage with a testing machine so as to allow a load to be applied to the screw along the axis of the screw.

The specimen was then mounted in a Zwick Universal Testing Machine and a 10N pre-load applied to the screw along the axis of the screw. Subsequently, the load was increased by setting a constant cross-head speed of 10 mm/minute until pull out was achieved.

The results are set out in Table 1. These are averages, each taken from 16 samples.

It can be seen that screw pull-out strength increases with decreasing water gauge. This is thought to be due to the fact that starch is more evenly distributed in boards prepared at a lower water gauge, that is, the starch has a lower tendency to migrate to the board surface.

TABLE 1

|  | Examples | | | | | | | | Comparative Examples | | |
|---|---|---|---|---|---|---|---|---|---|---|---|
|  | 1 | 2 | 3 | 4 | 5 | 6 | 7 | 8 | 1 | 2 | 3 |
| Water gauge (%) | 61 | 61 | 55 | 61 | 61 | 58 | 64 | 60 | 72 | 76 | 76 |
| Glass fibre, 6 mm length (%) | 2 | 2 | 2 | 2 | 2 | 2 | 2 | 2 | 2 | 2 | 2.5 |
| Acid modified starch (%) | 5[1] | 5.5[2] | 5[1] | 5[2] | 6[2] | 6[2] | 6[2] | 6[2] | 5[1] | 6[2] | 6[2] |
| Retarder [3] (%) | 0 | 0 | 0 | 0.01 | 0.01 | 0.01 | 0.02 | 0.02 | 0 | 0.02 | 0.02 |
| Fluidizer (%) | 0.2[4] | 0.2[4] | 0.2[4] | 0.2[4] | 0.2[4] | 0.3[4] | 1[5] | 1.3[5] | 0.2[4] | 0.8[6] | 0.8[6] |
| Setting accelerator (%) | 0.1 | 0.1 | 0.1 | 0.3 | 0.3 | 0.3 | 0.2 | 0.2 | 0.1 | 0.1 | 0.1 |
| Stucco | 100[7] | 100[7] | 100[7] | 100[7] | 100[7] | 100[7] | 100[8] | 100[8] | 100[7] | 100[8] | 100[8] |
| Line speed (M/min) | 27 | 27 | 27 | 22 | 22 | 22 | 22 | 22 | 27 | 22 | 22 |
| Screw Pull (N) | 729 | 735 | 793 | 627 | 666 | 734 | 617 | 701 | 495 | 572 | 600 |

[1]Merifilm 102 corn starch from Tate & Lyle
[2]Fluitex MB065 corn starch from Roquette
[3] PlastRetard from Sicit 2000
[4]Ethacryl M copolymer fluid iser comprising side chains from BASF
[5]Phosphated polycondensate fluidiser
[6]Bozzeto CA40
[7]Desulphogypsum
[8]Natural gypsum The panel of the third aspect of the invention may incorporate one or more features of the slurry formed in the method of the first aspect of the invention, whether taken alone or in combination.

DETAILED DESCRIPTION

The invention will now be described by way of example only.

Gypsum-based boards having a weight of 12 kg/m$^2$ were prepared from stucco slurries according to the recipes set out in Table 1. The amounts of the ingredients are given as a percentage relative to the stucco amount. The slurry was cast as a continuous band overlaying a first paper liner. A second paper liner was overlaid on the deposited slurry.

The gypsum was allowed to set and was cut into sections which were then dried to form gypsum-based boards.

Screw pull-out tests were carried out on samples measuring 100 mm by 100 mm that had been conditioned at a temperature of 23° C. and a relative humidity of 50%. A 50 mm single thread wood screw was inserted into the sample, passing through a metal load transfer element positioned on

The invention claimed is:

1. A panel having a gypsum-based core that comprises a gypsum matrix having embedded therein a migratory starch in an amount of at least 3 wt % relative to the gypsum and glass fibre in an amount of at least 1 wt % relative to the gypsum, the panel having a maximum dimension greater than 1 m, wherein the density of the gypsum-based core is greater than 700 kg/m$^3$, and the amount of gypsum in the gypsum-based core is greater than 60 wt %, and further wherein the total volume of water voids in the gypsum-based core is less than the total volume of the gypsum in the panel core.

2. The panel according to claim 1, formed by a continuous method comprising:
   forming a mixture comprising stucco, migratory starch, glass fibre and water;
   casting the mixture in a continuous band;
   maintaining the band under conditions sufficient for the stucco to form an interlocking matrix of set gypsum;
   cutting the band to form one or more wet panel precursors; and
   drying the wet panel precursor to form one or more gypsum-based panels;

wherein the weight ratio of water to stucco in the mixture is less than 0.7;

the stucco is present in the mixture in an amount of over 60 wt % relative to the total solids content of the mixture.

3. A panel according to claim 2, wherein the weight ratio of water to stucco in the mixture is less than 0.65.

4. A panel according to claim 2, wherein the weight ratio of water to stucco in the mixture is less than 0.55.

5. A panel according to claim 2, wherein the weight ratio of water to stucco in the mixture is greater than 0.4 and less than 0.65.

6. A panel according to claim 2, wherein the weight ratio of water to stucco in the mixture is greater than 0.4.

7. A panel according to claim 2, wherein the stucco is present in the mixture in an amount of over 70 wt % relative to the total solids content of the mixture.

8. A panel according to claim 2, wherein the stucco is present in the mixture in an amount of over 80 wt % relative to the total solids content of the mixture.

9. A panel according to claim 2, wherein the starch is present in the mixture in an amount of at least 4 wt % relative to the stucco.

10. A panel according to claim 2, wherein the starch is present in the mixture in an amount of at least 5 wt % relative to the stucco.

11. A panel according to claim 2, wherein the glass fibre is present in the mixture in an amount of over 2 wt % relative to the stucco.

12. A panel according to claim 2, wherein the mixture additionally comprises one or more of a fluidiser and a retarder.

13. A panel according to claim 1, wherein the glass fibres have an average length in the range 3-12 mm and an average diameter in the range 5-50 micron.

14. A panel according to claim 1, wherein the starch is an acid-thinned starch or an oxidised starch.

15. A panel according to claim 1, wherein the density of the gypsum-based panel is greater than 800 kg/m$^3$.

16. A panel according to claim 1, wherein the total volume of water voids in the gypsum-based core is less than 90% of the total volume of gypsum in the panel core.

17. A panel according to claim 1, wherein the total volume of water voids in the gypsum-based core is less than 80% of the total volume of gypsum in the panel core.

18. A panel having a gypsum-based core that comprises a gypsum matrix having embedded therein a migratory starch in an amount of at least 2.5 wt % relative to the gypsum and glass fibre in an amount of at least 0.8 wt % relative to the gypsum, the panel having a maximum dimension greater than 1 m, wherein the density of the gypsum-based core is greater than 700 kg/m$^3$, and the amount of gypsum in the gypsum-based core is greater than 60 wt %, and further wherein the total volume of water voids in the gypsum-based core is less than the total volume of the gypsum in the panel core.

19. The panel according to claim 18, formed by a continuous method comprising:

forming a mixture comprising stucco, migratory starch, glass fibre and water;

casting the mixture in a continuous band;

maintaining the band under conditions sufficient for the stucco to form an interlocking matrix of set gypsum;

cutting the band to form one or more wet panel precursors; and drying the wet panel precursor to form one or more gypsum-based panels;

wherein the weight ratio of water to stucco in the mixture is less than 0.7;

the stucco is present in the mixture in an amount of over 60 wt % relative to the total solids content of the mixture; and the starch is present in the mixture in an amount of at least 3 wt % relative to the stucco the glass fibre is present in the mixture in an amount of over 1 wt % relative to the stucco.

20. A panel according to claim 19, wherein the total volume of water voids in the gypsum-based core is less than 80% of the total volume of gypsum in the panel core.

* * * * *